Sept. 8, 1931.  W. H. BAHLKE  1,822,607
ART OF DISTILLING HYDROCARBON OILS AND APPARATUS THEREFOR
Filed April 4, 1927  2 Sheets-Sheet 1
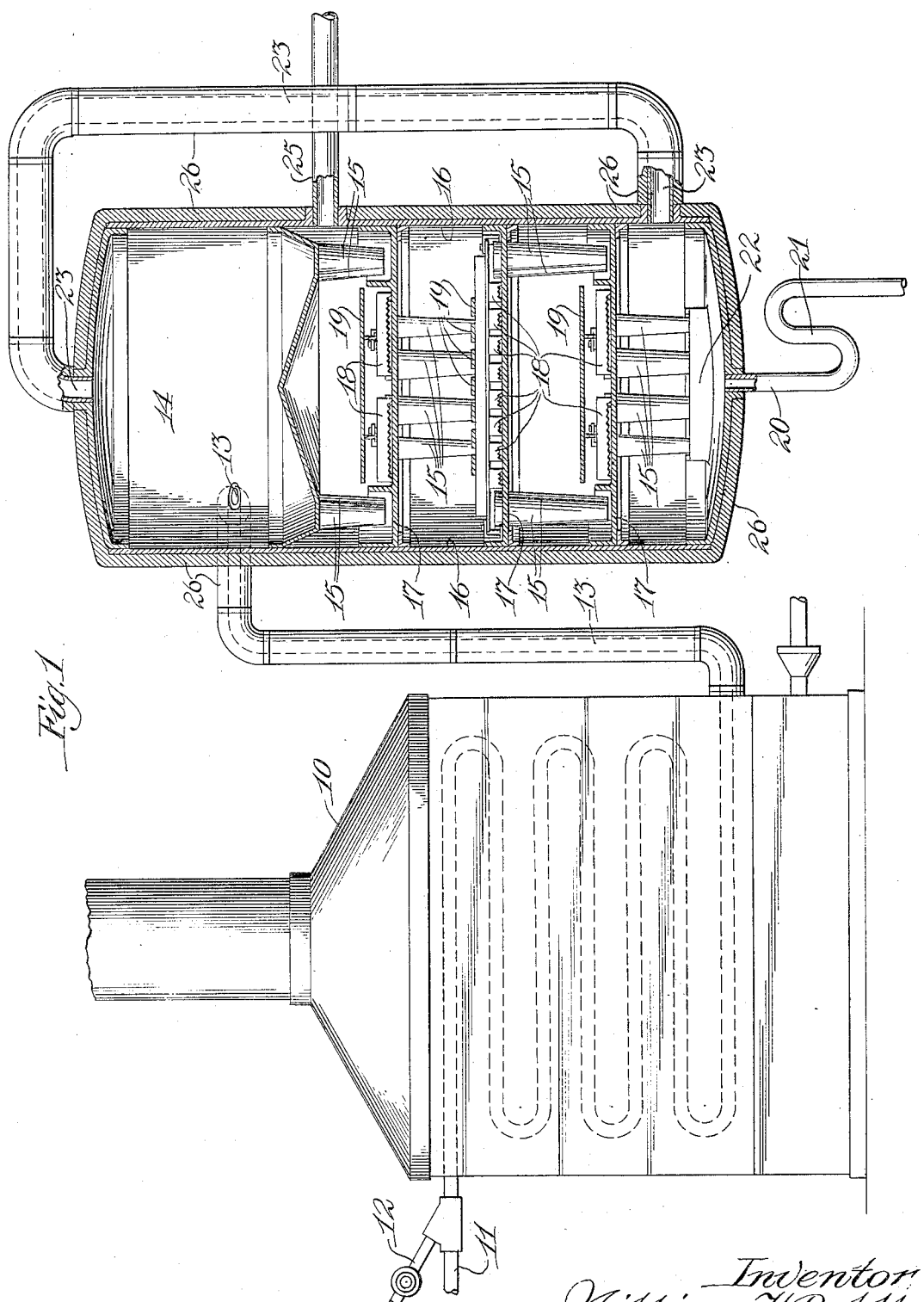

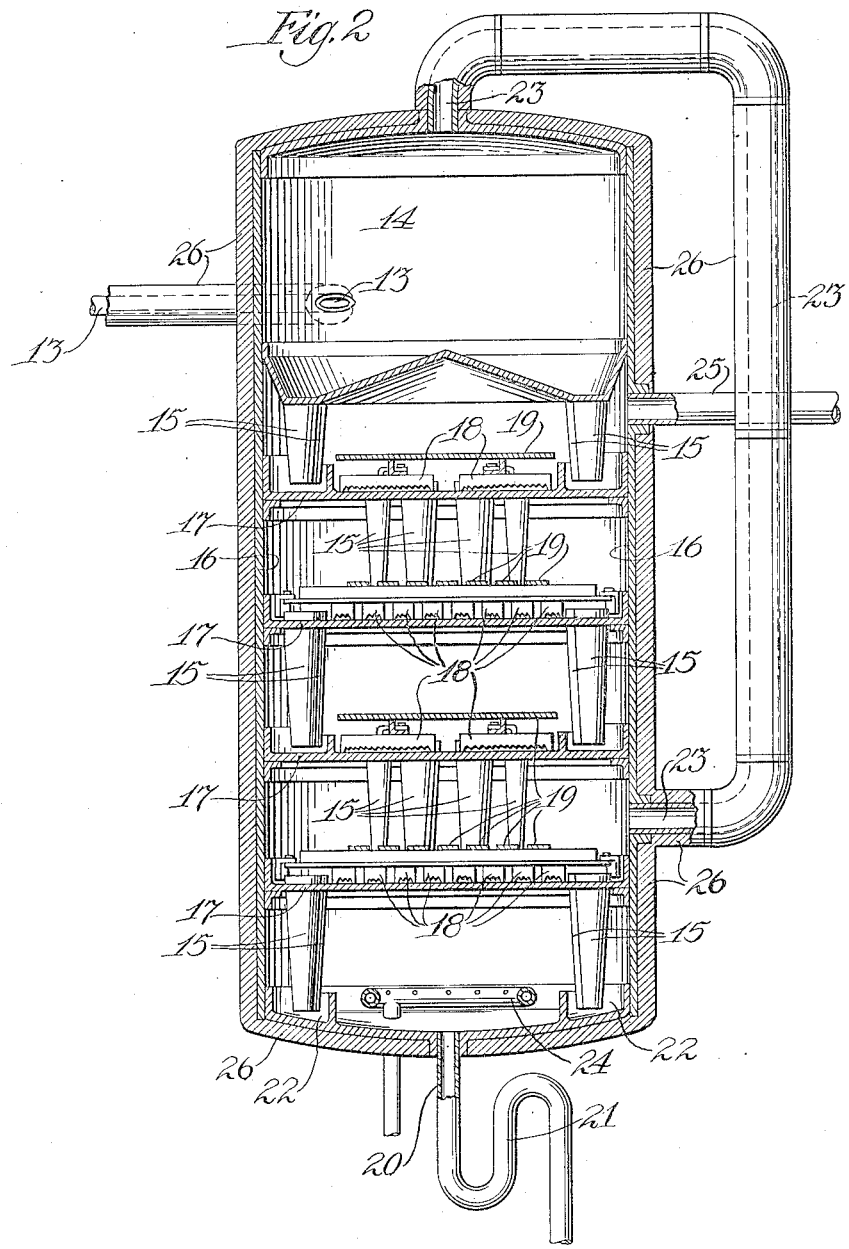

Patented Sept. 8, 1931

1,822,607

UNITED STATES PATENT OFFICE

WILLIAM H. BAHLKE, OF WHITING, INDIANA, ASSIGNOR TO STANDARD OIL COMPANY, OF WHITING, INDIANA, A CORPORATION OF INDIANA

ART OF DISTILLING HYDROCARBON OILS AND APPARATUS THEREFOR

Application filed April 4, 1927. Serial No. 180,963.

This invention relates to the distillation of hydrocarbon oils and will be readily understood from the following description in conjunction with the accompanying drawings, in which:

Figure 1 is an elevation partly in section of a suitable distillation apparatus; and Fig. 2 is a partial sectional view of a modified form of the apparatus.

Referring to the drawings, 10 is a pipe still to which oil is supplied by the pipe 11 under the pressure of a pump or other suitable supply means (not shown). A pipe 12 leads into the pipe 11, for the supply of steam thereto, when desired. The outlet pipe 13 of the pipe still leads into an enlarged separating chamber 14, preferably tangentially thereof. From the bottom of the chamber 14 liquid outlet pipes 15 extend into liquid in the upper portion of a stripping and equilibrating column 16. The chamber 14 and column 16 are suitably arranged within one casing in superimposed relation, a transverse partition serving as the bottom of chamber 14 and roof of column 16. The bottom of the chamber 14 may be inclined downwardly to the openings of pipes 15, if desired.

The column 16 is provided with fractionating or distributing devices of any suitable form by which ascending gases or vapors are effectively contacted with descending liquid. It is preferred to employ a fractionating tower construction of the type described in my Patent No. 1,702,805, dated February 19, 1929, comprising bubble-cap plates 17, elongated bubble-caps 18 and splash plates 19 overlying the spaces therebetween. More intimate contact between the liquid and vapor is thereby obtained and entrainment of liquid by the outgoing gases is substantially reduced. From the bottom of the bubble-tower 16 extends a liquid discharge pipe 20 which may be provided with a trap 21, to maintain a liquid seal therein and prevent escape of vapors therethrough. The overflow pipes from the lowest bubble-plate are provided with seals for preventing upward passage of vapors therethrough. These seals may suitably be cups 22 into which the overflow pipes dip.

From the top of the separating chamber 14 a vapor pipe 23 leads into the tower 16. A perforated steam pipe 24 extending into the lower part of the tower 16 may be provided, as shown in Fig. 2. In this case the vapors should be led by pipe 23 into an intermediate part of the tower 16. If a steam supply pipe is not provided in the bottom of the tower 16, the pipe 23 should lead thereinto below the lowest bubble-plate, as shown in Fig. 1.

The upper part of the tower 16 is provided with an outlet vapor pipe 25 which leads to suitable condensers or the like (not shown). The pipes 13 and 23, the chamber 14 and the tower 16 should be heavily lagged as shown at 26 to prevent heat loss therefrom.

The operation of the apparatus of Fig. 1 is as follows. Oil is pumped or otherwise forced through pipe still 10 and heated therein to partly vaporize it, and the mixed vapors and unvaporized oil are injected into chamber 14 in which separation of vapors from unvaporized oil takes place. Steam is supplied to the oil stream by pipe 12, if desired. The unvaporized oil passes down pipes 15 into and through the tower 16, being intimately contacted therein with the separated vapors, which are admitted by pipe 23 into the lower part of the tower 16 and pass upwardly through the bubble-caps thereof. The residue flows out through pipe 20. In this intimate contacting treatment, additional fractions are vaporized from the liquid oil and a more perfect equilibrium is attained between the vapors and liquid. The vapors pass off by pipe 25 which leads to a fractionating condenser or other apparatus (not shown) for further treatment.

In the apparatus of Fig. 2, the unvaporized oil from the chamber 14 passes down over equilibrating plates above the point of admission of the vapors from pipe 23 and then down over stripping plates below that point. In passing over the latter the oil is subjected to the stripping action of steam, preferably superheated, introduced by the perforated pipe 24, and lighter fractions are vaporized thereby. In passing over the equilibrating plates in the upper part of the column 16, the descending oil is intimately contacted with the ascending vapors, which comprise the vapors admitted by pipe 23, the steam admitted by pipe 24 and the vaporized light ends stripped thereby, in the stripping section. In this operation further light ends are vaporized from the oil and a more perfect equilibrium and separation of vaporized from the unvaporized oil are obtained.

The operation will be more fully understood from the following detailed example. Smackover crude of a gravity of 18.5° A. P. I. and viscosity of 465 sec. Saybolt (at 100° F.) is passed through the pipe still 10 together with steam supplied by pipe 12, the amount of steam being about 1.8 lbs. per gallon of oil. The temperature of the mixture issuing from the pipe still is about 720° F. The unvaporized oil is separated in chamber 14 and stripped by the separated vapors in the column 16 as hereinbefore described. The vapors passing off by pipe 25 are fractionally condensed yielding lubricating oil of about 20° A. P. I. gravity and viscosity 350 sec. Saybolt (at 100° F.), amounting to about 40% of crude oil, and gas oil of about 32° A. P. I. gravity amounting to about 30% of the crude oil. The residue, which amounted to about 30% of the crude oil, has a viscosity of about 400 sec. Furol (at 210° F.) and a specific gravity of about 1.0.

While the invention has been illustrated by the description of specific embodiments of the apparatus and a specific distillation operation, it is to be understood that it is not intended to limit the invention thereto except by the terms of the appended claims.

I claim:

1. The method of distilling hydrocarbon oils which consists in passing said oil in a confined stream through a heated zone wherein the oil receives the entire and sole heating for the process, delivering the mixed vapors and unvaporized oil into a separating chamber wherein a separation of vapors and unvaporized oil takes place, and passing said unvaporized oil downwardly and said vapors in countercurrent in intimate contact with each other said unvaporized oil and said vapors being brought into contact only with each other, whereby they are brought into equilibrium.

2. The method of distilling hydrocarbon oils which consists in heating a confined stream of oil in a coil wherein the oil receives the entire and sole heating for the process and thereby vaporizing part of the oil, supplying the mixed liquid and vapors into a separating chamber, removing unvaporized oil from said chamber and causing it to flow downwardly through a stripping tower, withdrawing vapors from said chamber and causing them to ascend through said stripping tower together with steam, said unvaporized oil and said vapors and steam being brought into contact only with each other whereby they will be brought into equilibrium.

3. The method of distilling hydrocarbon oils, which consists in subjecting the oil to a heating means wherein the oil receives the entire and sole heating for the process, separating vapors from unvaporized oil, passing the unvaporized oil downwardly through an equilibrating section and a stripping section of a fractionating column, subjecting the oil to the stripping action of steam in the stripping section and to intimate contact in the equilibrating section with the vapors separated from the heated oil, and the steam and stripped vapors from the stripping section, said unvaporized oil and said vapors and steam being brought into contact only with each other, whereby they are brought into equilibrium.

4. The method of distilling hydrocarbon oils, which consists in subjecting the oil to a heating means wherein the oil receives the entire and sole heating for the process, separating vapors from unvaporized oil, passing the unvaporized oil downwardly through a fractionating column at substantially the same pressure as that at which separation is effected and passing the separated vapors upwardly through said column said unvaporized oil and said vapors being brought into contact only with each other, whereby they are brought into equilibrium.

5. Apparatus for distilling oil comprising a coil, means for heating said coil constituting the sole heating means for the oil during its travel through the apparatus, a separating chamber into which said coil is adapted to feed, a stripping tower, means for conveying oil from said chamber to the upper part of said tower, means for conveying vapors from said chamber to a lower part of said tower said stripping tower receiving only the vapors and unvaporized oil from said separating chamber, and means for withdrawing oil and vapors from the lower and upper parts of said tower respectively.

6. Apparatus for distilling oil, comprising a coil, means for heating said coil, a separating chamber into which said coil is adapted to feed, a stripping tower immediately below and within the same casing, as the separating chamber, means for conveying oil from said chamber to the upper part of said stripping tower and preventing passage of vapors therethrough, means for conveying vapors from said chamber to a lower part of said tower, said stripping tower receiving only the vapors and unvaporized oil from said separating chamber, and means for withdrawing oil and vapors from the lower and upper parts of said tower.

7. Apparatus for distilling oil comprising a pipe still wherein the oil is heated and which constitutes the sole heating means for the oil during its travel through the apparatus, a separating chamber into which said still is adapted to feed, a stripping tower, means for supplying oil from said chamber to the upper part of said tower, means for supplying vapors from said chamber to an intermediate part of said tower, means for supplying steam into the lower part of said tower, said stripping tower receiving only the vapors and unvaporized oil and steam from said separating chamber, and means for withdrawing oil and vapors from the lower and upper parts of said tower respectively.

8. Apparatus for distilling oil comprising a coil, means for heating said coil, a casing comprising a separating chamber in the upper part thereof and a stripping column in the lower part thereof, means for supplying heated oil from said coil to said chamber, liquid sealed means for removing unvaporized oil from said chamber into the upper part of said column, means for conducting separated vapors from said chamber to the lower part of said column said stripping column receiving only the vapors and unvaporized oil from said separating chamber, means for withdrawing liquid residue from the lower part of said column, and means for withdrawing vapors from the upper part of said column.

9. Apparatus for distilling oil comprising a coil, means for heating said coil, a casing, a transverse partition in said casing forming a separating chamber in the upper portion of said casing into which said coil is adapted to feed, fractionating devices in the casing below said partition, means for supplying unvaporized oil from the separating chamber to and above said fractionating devices, means for conducting vapors from the separating chamber to the casing below said fractionating devices said fractionating devices receiving only the vapors and unvaporized oil from said separating chamber, means for withdrawing vapors from the casing above said fractionating devices, and means for withdrawing liquid oil from the casing below said fractionating devices.

10. In combination, means for initially heating oil and constituting the sole means for heating the same, means for separating vapors from unvaporized oil, a fractionation column comprising an equilibrating section and a subjacent stripping section both provided with fractionating devices, means for supplying unvaporized oil to the top of the equilibrating section, means for supplying separated vapors between the equilibrating and stripping sections, means for supplying steam below the stripping section, said equilibrating and stripping sections receiving only the vapors and unvaporized oil and steam from said separating means, means for withdrawing oil from below the stripping section, and means for withdrawing vapors from above the equilibrating section.

In testimony whereof I have hereunto set my hand this 23rd day of March, 1927.

WILLIAM H. BAHLKE.